United States Patent
Bhat et al.

(10) Patent No.: US 11,157,004 B2
(45) Date of Patent: Oct. 26, 2021

(54) REAL-TIME CONTROL SYSTEM FOR A VEHICLE AND A METHOD OF EXECUTING CONTROL OF THE VEHICLE VIA THE REAL-TIME CONTROL SYSTEM

(71) Applicant: GM Global Technology Operations LLC, Detroit, MI (US)

(72) Inventors: Anand Bhat, Pittsburgh, PA (US); Soheil Samii, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 16/371,672

(22) Filed: Apr. 1, 2019

(65) Prior Publication Data

US 2020/0310426 A1 Oct. 1, 2020

(51) Int. Cl.
| | |
|---|---|
| *G05D 1/00* | (2006.01) |
| *G06F 3/06* | (2006.01) |
| *B60W 10/18* | (2012.01) |
| *B60W 10/30* | (2006.01) |
| *B60W 30/188* | (2012.01) |
| *B60W 50/00* | (2006.01) |
| *B60W 10/04* | (2006.01) |

(52) U.S. Cl.
CPC .......... *G05D 1/0088* (2013.01); *B60W 10/04* (2013.01); *B60W 10/18* (2013.01); *B60W 10/30* (2013.01); *B60W 30/188* (2013.01); *B60W 50/00* (2013.01); *G06F 3/065* (2013.01); *G06F 3/0619* (2013.01); *G06F 3/0683* (2013.01); *B60W 2050/0006* (2013.01); *G05D 2201/0213* (2013.01)

(58) Field of Classification Search
CPC .......... G05D 1/0088; G05D 2201/0213; G06F 3/0619; G06F 3/065; G06F 3/0683; B60W 10/18; B60W 10/30; B60W 30/188; B60W 50/00; B60W 10/04; B60W 2050/0006; B60W 50/023; B60W 50/0225; B60W 30/14
See application file for complete search history.

(56) References Cited

U.S. PATENT DOCUMENTS

| | | | |
|---|---|---|---|
| 2006/0015231 A1* | 1/2006 | Yoshimura | ................ B60T 7/12 701/48 |
| 2019/0258251 A1* | 8/2019 | Ditty | .................. G06K 9/00805 |
| 2019/0286153 A1* | 9/2019 | Rankawat | ................. G06T 7/11 |

\* cited by examiner

*Primary Examiner* — Marthe Y Marc-Coleman

(74) *Attorney, Agent, or Firm* — Quinn IP Law

(57) ABSTRACT

A real-time control system for a vehicle, and a method of executing control of the vehicle via the real-time control system includes at least one primary controller that is configured to control slave controllers. The primary controller is configured to queue a task requested by respective vehicle systems, and determine which of the slave controllers is available to execute the task. The primary controller is configured to assign the task to a selected one of the slave controllers to execute the task. The primary controller is configured to re-queue the assigned task if the selected one of the slave controllers does not completely execute the assigned task. The primary controller is configured to assign that re-queued task to another one of the slave controllers to execute the re-queued task. The respective vehicle systems perform the requested task when the selected one of the slave controllers completely executes the assigned task.

20 Claims, 2 Drawing Sheets

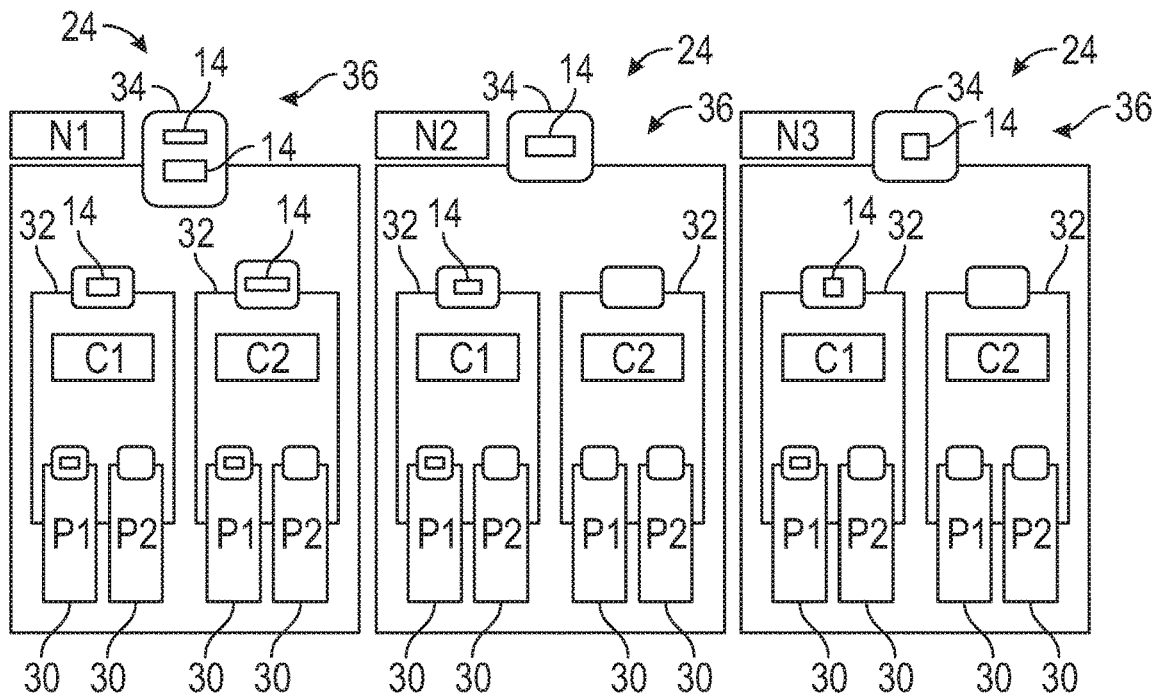
FIG. 4
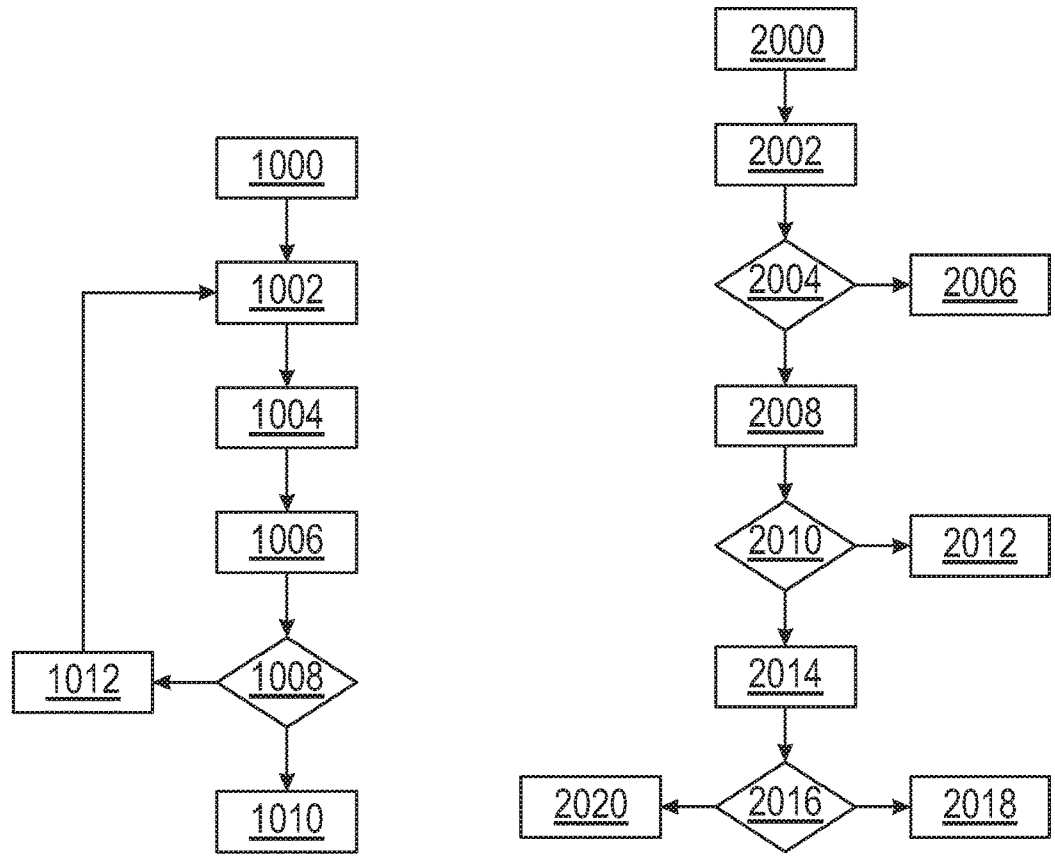
FIG. 5
FIG. 6

REAL-TIME CONTROL SYSTEM FOR A VEHICLE AND A METHOD OF EXECUTING CONTROL OF THE VEHICLE VIA THE REAL-TIME CONTROL SYSTEM

INTRODUCTION

Vehicles include many different systems to operate. Computer systems have been used to control the different vehicle systems.

SUMMARY

The present disclosure provides a real-time control system for a vehicle. The control system includes at least one primary controller configured to execute instructions via a processor of the primary controller. The control system also includes a plurality of slave controllers configured to execute instructions via a processor of the respective slave controllers. The primary controller is in communication with the slave controllers, and the primary controller is configured to control the slave controllers. The control system further includes a plurality of vehicle systems configured to operate in response to at least one task requested via the respective vehicle systems. The vehicle systems are in communication with the primary controller. The primary controller is configured to execute the instructions to queue the task requested by the respective vehicle systems, and determine which of the slave controllers is available to execute the task. The primary controller is configured to execute the instructions to assign the task to a selected one of the slave controllers to execute the task. Additionally, the primary controller is configured to execute the instructions to re-queue the assigned task if the selected one of the slave controllers does not completely execute the assigned task. The primary controller is also configured to execute the instructions to assign the re-queued task to another one of the slave controllers to execute the re-queued task. The respective vehicle systems operate when the selected one of the slave controllers completely executes the assigned task.

The present disclosure also provides a method of executing control of a vehicle via a real-time control system. The method includes communicating between at least one primary controller and a plurality of slave controllers. The primary controller is configured to control the slave controllers, and additionally, the primary controller and the slave controllers are each configured to execute instructions via a respective processor. The method also includes communicating between the at least one primary controller and a plurality of vehicle systems. The vehicle systems are configured to operate in response to at least one task requested via the respective vehicle systems. The method further includes queuing, via the primary controller, the task requested by the respective vehicle systems, and determining, via the primary controller, which of the slave controllers is available to execute the task. The method also includes assigning the task to a selected one of the slave controllers to execute the task. The method further includes re-queuing, via the primary controller, the assigned task if the selected one of the slave controllers does not completely execute the assigned task. The method includes determining, via the primary controller, which of the slave controllers is available to execute the re-queued task, and assigning the re-queued task to another one of the slave controllers to execute that re-queued task. The method includes operating the respective vehicle systems when the selected one of the slave controllers completely executes the assigned task.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 4 is a schematic illustration of the components of the slave controllers.

FIG. 5 is a schematic flowchart of a method of executing the real-time control system for the vehicle.

FIG. 6 is a schematic flowchart of a fault notification being issued.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
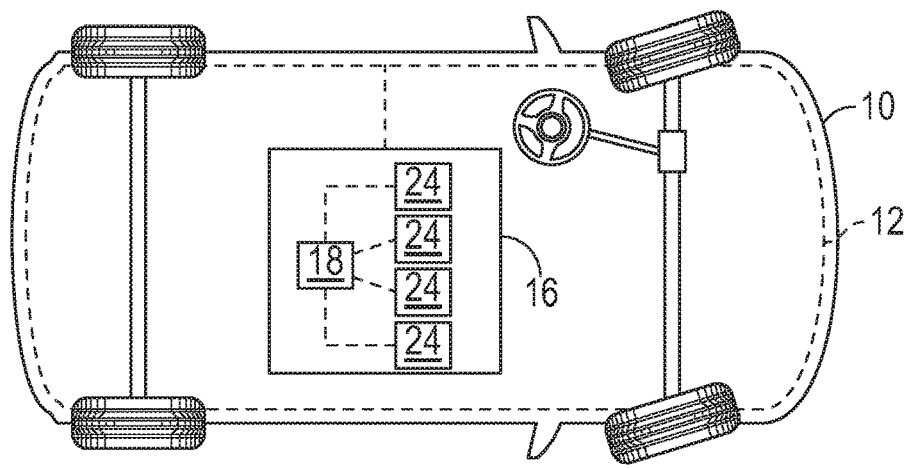
FIG. 1 is a schematic illustration of a vehicle including a plurality of vehicle systems each in communication with a real-time control system.

Referring to the FIGS., wherein like numerals indicate like or corresponding parts throughout the several views, a vehicle 10 is generally shown in FIG. 1. Generally, the vehicle 10 includes a plurality of vehicle systems 12 that are configured to operate in response to at least one task 14 requested via the respective vehicle systems 12. Therefore, various vehicle systems 12 may be configured to perform a plurality of tasks 14, and thus, the various vehicle systems 12 may perform many operations.

As a non-limiting example, the vehicle systems 12 may include an adaptive cruise control, a display screen control, autonomous control system, a brake system and powertrain controls. Additional non-limiting examples of the vehicle systems 12 may include battery controls, accelerator controls, lane assist controls, lock controls, ignition controls, auto-play controls, exhaust after treatment controls, etc.

The task(s) 14 requested by the vehicle systems 12 may relate to the adaptive cruise control, the display screen control, the autonomous control system, the brake system, the powertrain controls, etc. or the task(s) 14 of any other vehicle systems 12. The selected or requested task(s) 14 are performed in real-time. Therefore, a real-time control system 16 may be used in the vehicle 10. Furthermore, the present disclosure also provides a method of executing control of the vehicle 10 via the real-time control system 16. The real-time control system 16 provides a fault-tolerant computing architecture for embedded real-time vehicular applications. When referring to the real-time control system 16, the system 16 may include high level controls (such as adaptive cruise control, autonomous controls, etc.) as well as low level controls (such as radio controls, display screen controls, etc.).

Generally, the real-time control system 16 provides a way to execute the selected or requested task(s) 14 in real-time to operate the vehicle systems 12. If the selected or requested task(s) 14 is incomplete then the real-time control system 16 provides an implicit fault tolerance which automatically re-queues the incomplete task 14 until the task 14 is completed or until the task 14 deadline is missed. The real-time control system 16 described herein provides seamless implicit fault tolerance and redundancy. Generally, the real-time control system 16 also provides reduced cost, reduced weight and space savings while also providing a back-up to operate the vehicle systems 12 by eliminating the need for redundant hardware.

For example, the display screen control may provide various information/options to the user, and the user may select various desired features. As such, the display screen control may provide various information/options to select a radio mode (AM, FM, Satellite, MP3, etc.), a phone control, seat features, such as heated or cooled seat or massage, a map/global positioning system (GPS), temperature control of the vehicle 10 (HVAC, etc.), a clock, a compass, etc. The real-time control system 16 is used to complete the selected task 14 of the display screen control and thus allow real-time operation of the display screen control.

As another example, the autonomous control system may provide the control to guide the vehicle 10 to a destination without being physically steered by a passenger. Therefore, the autonomous control system may include one or more cameras, sensors, steering components, etc. to maintain a position of the vehicle 10 along a road. The autonomous control system may also include one or more brake components to slow or stop the vehicle 10, and one or more accelerator components to accelerate or propel the vehicle 10. The real-time control system 16 is used to complete the selected task 14 of the autonomous control system and thus allow real-time operation of the autonomous control system.

As yet another example, the brake system may include an anti-lock brake system (ABS) that may be activated under certain road conditions. The real-time control system 16 is used to complete the selected task 14 of operating the ABS under certain road conditions, and thus allow real-time operation of the brake system.

As another example, the powertrain controls may include an engine, a transmission, a torque converter, sensors for the engine or the transmission, fuel injector controls, temperature controls for the engine, pumps for the engine, pumps for the transmission, clutch controls for the transmission, radiator controls, etc. If the vehicle 10 is a hybrid vehicle or an electric vehicle, the powertrain controls may include one or more electric motors. The real-time control system 16 is used to complete the selected task 14 of operating the powertrain controls, and thus allow real-time operation of the powertrain.

Some of the desired tasks 14 may be internal to the vehicle systems 12, which assists indirectly to the operation of one or more vehicle systems 12. For example, various components of the vehicle systems 12 may be monitored, etc. Therefore, in certain configurations, the real-time control system 16 is used to complete the tasks 14 of monitoring various vehicle systems 12 or complete some other internal task 14 to assist the vehicle systems 12 to operate.

Figure 2:
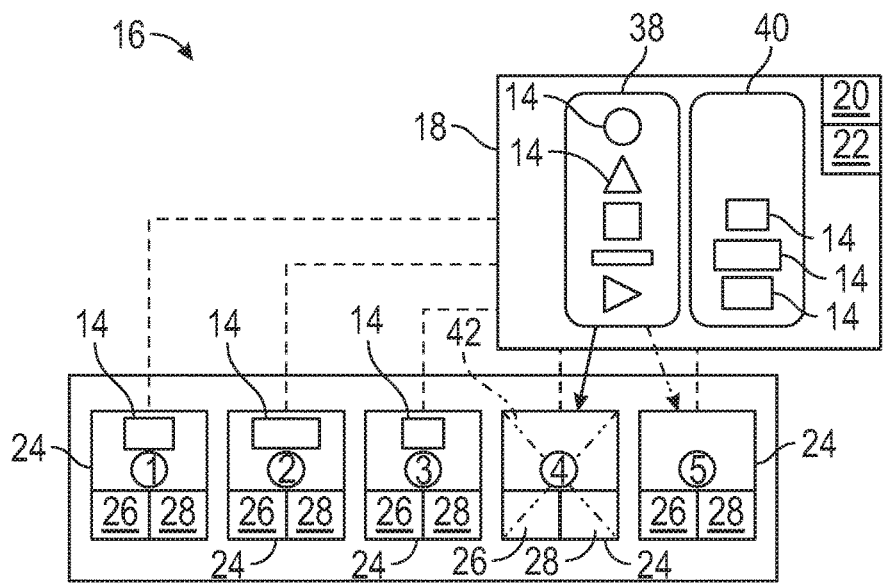
FIG. 2 is a schematic illustration of the real-time control system including a primary controller and a plurality of slave controllers, with the fourth slave controller indicating an interruption.
Figure 3:
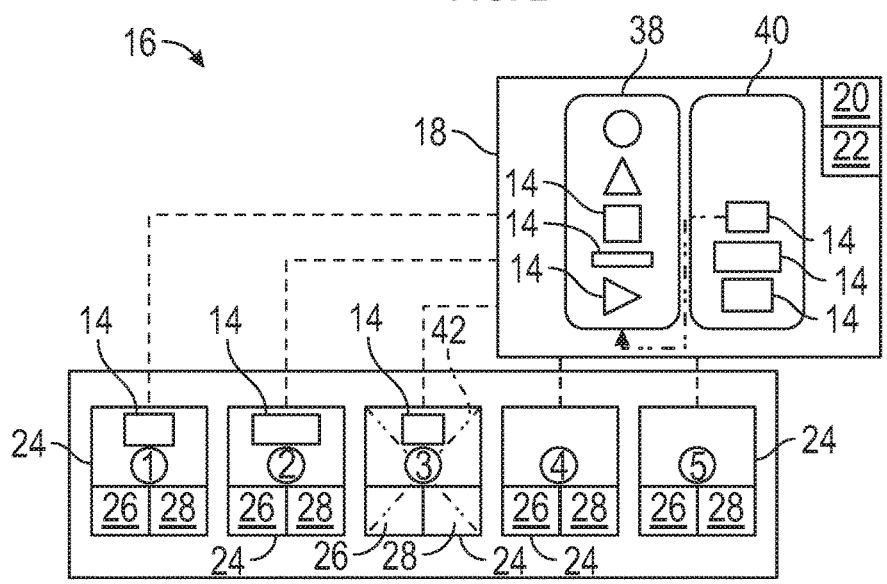
FIG. 3 is a schematic illustration of the task assigned to the third slave controller indicating a fault notification and that task being sent back to a holding queue program.

Referring to FIGS. 2 and 3, the real-time control system 16 includes at least one primary controller 18 configured to execute instructions via a processor 22 of the primary controller 18. The instructions may be saved in memory 20 of the primary controller 18. If more than one primary controller 18 is used, each of the primary controllers 18 is configured to execute instructions via the respective processor 22. Again, the instructions may be saved in the memory 20 of the primary controller 18. Generally, the primary controller(s) 18 ensures that the requested task 14 of the vehicle system 12 operates.

For example, the primary controller(s) 18 may be a host machine or distributed system, e.g., a computer such as a digital computer or microcomputer, and, as the memory 20, tangible, non-transitory computer-readable memory such as read-only memory (ROM) or flash memory. The primary controller(s) 18 may also have, as memory 20, random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the primary controller(s) 18 may include all software, hardware, memory 20, algorithms, connections, sensors, etc., necessary to control and monitor, for example, the slave controllers 24 and the vehicle systems 12. As such, a control method operative to control the slave controllers 24 may be embodied as software or firmware associated with the primary controller(s) 18. It is to be appreciated that the primary controller(s) 18 may also include any device capable of analyzing data from various sensors, comparing data, making the necessary decisions required to control and/or monitor the slave controllers 24 and the vehicle systems 12. As indicated above, more than one primary controller(s) 18 may be utilized and include the features discussed in this paragraph.

Continuing with FIGS. 2 and 3, the real-time control system 16 also includes a plurality of slave controllers 24 configured to execute instructions via a processor 28 of the respective slave controllers 24. The instructions may be saved in memory 26 of the respective slave controllers 24. Generally, the primary controller 18 is in communication with the slave controllers 24. Said differently, communication occurs between the at least one primary controller 18 and the plurality of slave controllers 24. Specifically, the primary controller 18 is configured to control the slave controllers 24. Regardless of how many primary controllers 18 are used, each of the primary controllers 18 are in communication with all of the slave controllers 24, and thus, each of the primary controllers 18 are configured to control any of the slave controllers 24. By using the plurality of slave controllers 24, a high-volume of tasks 14 may be executed quickly, and thus ensure a high-average throughput.

For example, the slave controllers 24 may be a host machine or distributed system, e.g., a computer such as a digital computer or microcomputer, and, as the memory 26, tangible, non-transitory computer-readable memory such as read-only memory (ROM) or flash memory. The slave controllers 24 may also have, as memory 26, random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the slave controllers 24 may include all software, hardware, memory 26, algorithms, connections, sensors, etc., necessary to control, for example, the vehicle systems 12. As such, a control method operative to control the slave controllers 24 may be embodied as software or firmware associated with the slave controllers 24. It is to be appreciated that the slave controllers 24 may also include any device capable of analyzing data from various sensors, comparing data, making the necessary decisions required to control the vehicle systems 12.

Referring to FIG. 4, a more specific example of the processor 28 of each of the slave controllers 24 is illustrated. The processor 28 of each of the slave controllers 24 may include a process level 30, a core level 32, a node level 34 and a system level 36. The process level 30, the core level 32 and the node level 34 are all sub-sets of the system level 36. The core level 32 may include a plurality of cores, and the process level 30 may include a plurality of processors 22. The core level 32 is a sub-set of the node level 34 and the process level 30 is a sub-set of the core level 32. The hierarchy of the system level 36, the node level 34, the core level 32 and the process level 30 are coordinated to ensure timely execution of the assigned task 14.

Depending on the task 14 to be executed, the selected slave controller 24 will determine which level to use to execute the task 14. The system level 36 and the node level 34 generally refer to the computing node as a whole, for example, the entire host machine, computer etc. The core level 32 generally refers to the processing unit, for example, the processor 22, CPU etc. The process level 30 generally refers to specific threads that execute the assigned task 14.

For illustrative purposes, FIG. 4 identifies three slave controllers 24 with the process level 30, the core level 32, the node level 34 and the system level 36. Continuing with FIG. 4, for example, the first node level 34 (of one of the slave controllers 24) has two assigned tasks 14, and one of these tasks 14 has been assigned to a first core and assigned to the first processor 22 of the first core; and additionally, the other one of the tasks 14 has been assigned to the second core and assigned to the first processor 22 of the second core. Again continuing with FIG. 4, the second processor 22 of the second core of the first node is open to take a new task 14, and additionally, for example, the second core of the second node is open to take a new task 14, and so on in this figure.

As mentioned above, the vehicle systems 12 are configured to operate in response to at least one task 14 requested via the respective vehicle systems 12. The vehicle systems 12 are in communication with the primary controller 18. Said differently, communication occurs between the at least one primary controller 18 and the plurality of vehicle systems 12. Therefore, the primary controller 18 receives a signal, or an execution sequence is predefined, or in other words statically defined, in the instructions of the primary controller 18, that a selected task 14 of a selected vehicle system 12 needs to be performed, and the primary controller 18 assigns that task 14 for execution to operate that vehicle system 12. To do so, the primary controller 18 determines which of the slave controllers 24 is available to perform the requested task 14. For example, if the autonomous control system is activated, one or more tasks 14 are sent to the primary controller 18, and the primary controller 18 then selects one of the slave controllers 24 to execute the task(s) 14 to operate the autonomous control system. More than one task 14 may be assigned to one or more of the slave controllers 24 to operate the autonomous control system because autonomous systems 12, 16 may include controls of the steering, braking, accelerating, sensors, etc.

The primary controller 18 is configured to queue the task 14 requested by the respective vehicle systems 12. Furthermore, the primary controller 18 is configured to determine which of the slave controllers 24 is available to execute the task 14. Generally, when a new task 14 is requested, all of these new tasks 14 are held by the primary controller 18 while the primary controller 18 determines which of the slave controllers 24 is to execute the task 14. Therefore, the primary controller 18 may include a holding queue program 38 in communication with the vehicle systems 12. The holding queue program 38 is configured to queue the task 14 requested until the primary controller 18 assigns the task 14 to the selected one of the slave controllers 24. In certain configurations, queuing the task 14 may include queuing the task 14 requested in the holding queue program 38 of the primary controller 18 until the primary controller 18 assigns the task 14 to the selected one of the slave controllers 24.

Referring to FIG. 2, for illustrative purposes, five tasks 14 are pending in the holding queue program 38, and these tasks 14 are waiting to be assigned to one or more of the slave controllers 24. FIG. 2 also illustrates that the primary controller 18 recognizes that the fourth slave controller 24 cannot perform the task 14, then the primary controller 18 skips the fourth slave controller 24 and looks for the next available slave controller 24 (such as the fifth slave controller 24 in this illustration) to perform the task 14 (see the phantom lines in FIG. 2). The holding queue program 38 may be software executed via the primary controller 18.

As implied above, the primary controller 18 is also configured to assign the task 14 to the selected one of the slave controllers 24 to execute the task 14. Said differently, the task 14 is assigned to the selected one of the slave controllers 24 to execute the task 14. Referring to FIG. 2, for illustrative purposes, one task 14 has been assigned to three different slave controllers 24, and these three tasks 14 have been removed from the holding queue program 38.

Once the task 14 has been assigned to one of the slave controllers 24, the task 14 is monitored until the task 14 is completed. Therefore, the primary controller 18 may include a monitoring program 40 in communication with the slave controllers 24. The monitoring program 40 is configured to monitor each assigned task 14 that is currently being executed by the selected one of the slave controllers 24. More specifically, each assigned task 14 that is currently being executed by the selected one of the slave controllers 24 is monitored in the monitoring program 40 of the primary controller 18. The monitoring program 40 may be software executed via the primary controller 18.

The respective vehicle systems 12 operate when the selected one of the slave controllers 24 completely executes the assigned task 14. In other words, the respective vehicle systems 12 operate as requested when the selected one of the slave controllers 24 completely executes the assigned task 14. If the task 14 is completed by the selected slave controller 24, then the task 14 is de-queued from the primary controller 18. If the task 14 is de-queued, then the vehicle system 12 operated as requested. The selected one of the slave controllers 24 is configured to communicate to the monitoring program 40 that execution of the assigned task 14 is complete. Generally, the task 14 is de-queued from the monitoring program 40. More specifically, the assigned task 14 is de-queued from the monitoring program 40 when the selected one of the slave controllers 24 completes the assigned task 14. Furthermore, the task 14 is de-queued from the primary controller 18. Therefore, until that same task 14 is requested, that task 14 will not show up in the holding queue program 38 or the monitoring program 40.

If the task 14 cannot be completed by the selected slave controller 24 then that task 14 needs to be reassigned. More specifically, if the task 14 cannot be completed by the selected slave controller 24, then the task 14 will be sent back to the holding queue program 38 in order to provide automatic and implicit fault tolerance. Therefore, a fault notification 42 is communicated to the primary controller 18 when the task 14 currently being executed by the selected one of the slave controllers 24 is not completed by a predetermined event, and more specifically, the monitoring program 40 communicates the fault notification 42 to the primary controller 18. Hence, the monitoring program 40 issues the fault notification 42, and the task 14 to be re-assigned is sent back to the holding queue program 38. The slave controllers 24 are arranged to run in parallel (as compared to series), and thus, if the fault notification 42 occurs, the task 14 may be quickly reassigned because multiple slave controllers 24 will not be tied to that fault notification 42, which ensures a high-average throughput.

As such, the primary controller 18 re-queues the assigned task 14 back into the holding queue program 38 when the fault notification 42 is received. More specifically, the task 14 is removed from the monitoring program 40 and re-queued to the holding queue program 38. In certain configurations, re-queuing the task 14 may include re-queuing the task 14 requested in the holding queue program 38 of the primary controller 18 until the primary controller 18 assigns the re-queued task 14 to the selected one of the slave controllers 24. Referring to FIG. 3, for illustrative purposes, the task 14 assigned to the third slave controller 24 indicates the fault notification 42, and it is that task 14 that is sent back to the holding queue program 38 to be re-assigned. As non-limiting examples, the predetermined event that triggers the fault notification 42 may include a predetermined amount of time, a power interruption, a hardware interruption and a software interruption.

Once the re-queued task 14 is back in the holding queue program 38, the primary controller 18 will again select one of the slave controllers 24 to try to execute the re-queued task 14. Therefore, the primary controller 18 is configured to re-queue the assigned task 14 if the selected one of the slave controllers 24 does not completely execute the assigned task 14. The primary controller 18 is configured to determine which of the slave controllers 24 is available to execute the re-queued task 14, and is configured to assign the re-queued task 14 to another one of the slave controllers 24 to execute the re-queued task 14. The primary controller 18 may assign the re-queued task 14 to any of the slave controllers 24. Therefore, in certain situations, the primary controller 18 may assign the re-queued task 14 to the same slave controller 24 that did not previously complete the re-queued task 14.

The task 14 may be re-queued over and over again until the task 14 is completed or until the task 14 deadline is missed. If the task 14 cannot be performed, or in certain situations if the deadline is missed, an alternate program may be implemented or triggered via the primary controller 18 to operate one or more vehicle systems 12. The alternate program is configured to execute various requested tasks 14 as requested via the primary controller 18 (these tasks 14 may or may not be assigned to one or more of the slave controllers 24 depending on whether there is an interruption with the slave controllers 24). The alternate program may be software executed via the primary controller 18. As an example, if the task 14 to operate a camera of the autonomous control system cannot be completed, then the primary controller 18 may implement/trigger the alternate program to operate various vehicle systems 12 to pull the vehicle 10 over to a shoulder of a road.

Any suitable number of primary controllers 18 may be utilized. In certain configurations, the at least one primary controller 18 is further defined as one primary controller 18. In other configurations, the at least one primary controller 18 is further defined as a plurality of primary controllers 18. Again, as discussed above, regardless of how many primary controllers 18 are used, each of the primary controllers 18 are in communication with all of the slave controllers 24, and thus, each of the primary controllers 18 are configured to control any of the slave controllers 24.

The real-time control system 16 also provides a back-up to the primary controller(s) 18 in case an interruption occurs to one or more of the primary controllers 18. Depending on the number of primary controllers 18, backing-up the primary controller(s) 18 may vary, and examples of different back-ups are discussed below.

When using a single primary controller 18, the one primary controller 18 is in communication with each of the slave controllers 24. Therefore, the one primary controller 18 is configured to control each of the slave controllers 24. To ensure that all of the instructions, which include software, of the one primary controller 18 are not lost if the interruption occurs to the primary controller 18, a back-up is stored for that single primary controller 18. Specifically, a back-up copy of the instructions of the primary controller 18 is also stored in the memory 20 of one of the slave controllers 24. The back-up copy of the instructions are stored in the memory 20 of one, single slave controller 24. The primary controller 18 chooses the single slave controller 24 to provide this redundancy. Therefore, if the interruption occurs to the primary controller 18, the chosen slave controller 24 functions as the primary controller 18, thus providing seamless execution of the vehicle systems 12.

When using more than one primary controller 18, each of the primary controllers 18 is in communication with each of the slave controllers 24. Furthermore, each of the primary controllers 18 are in communication with certain vehicle systems 12. Therefore, the primary controllers 18 are assigned certain vehicle systems 12, which do not overlap. As such, one of the primary controllers 18 is in communication with a first set of the vehicle systems 12. Another one of the primary controllers 18 is in communication with a second set of the vehicle systems 12. And so on depending on the number of primary controllers 18 being utilized. As one non-limiting example, the first set of the vehicle systems 12 may include the autonomous control systems 12, 16 and the brake system, and the second set of the vehicle systems 12 may include the display screen control and the powertrain controls.

Each of the primary controllers 18 function as discussed above, except that the primary controller 18 functions when the assigned vehicle systems 12 are to operate. Therefore, as a brief example, the one of the primary controllers 18 is configured to queue the task 14 requested by the first set of the vehicle systems 12, and determine which of the slave controllers 24 is available to execute the task 14 from the first set of the vehicle systems 12. Furthermore, the one of the primary controllers 18 is configured to assign the task 14 to the selected one of the slave controllers 24 to execute the task 14 from the first set of the vehicle systems 12. Additionally, the one of the primary controllers 18 is configured to re-queue the assigned task 14 if the selected one of the slave controllers 24 does not completely execute the assigned task 14, and assign the re-queued task 14 to another one of the slave controllers 24 to execute the re-queued task 14.

Furthermore, as a brief example, the another one of the primary controllers 18 is configured to queue the task 14 requested by the second set of the vehicle systems 12, and determine which of the slave controllers 24 is available to execute the task 14 from the second set of the vehicle systems 12. The another one of the primary controllers 18 is configured to assign the task 14 to the selected one of the slave controllers 24 to execute the task 14 from the second set of the vehicle systems 12. Additionally, the another one of the primary controllers 18 is configured to re-queue the assigned task 14 if the selected one of the slave controllers 24 does not completely execute the assigned task 14, and assign the re-queued task 14 to another one of the slave controllers 24 to execute the re-queued task 14.

To ensure that all of the instructions, which include software, of each of the primary controllers 18 are not lost if the interruption occurs to the respective primary controllers 18, a back-up is stored for each of the primary controllers 18. Specifically, a back-up copy of the instructions of the one of the primary controllers 18 is also stored in the memory 20 of one of the slave controllers 24. Additionally, a back-up copy of the instructions of the another one of the primary controllers 18 is also stored in the memory 20 of another one of the slave controllers 24. And so on depending on the number of primary controllers 18 being utilized. The back-up copies are saved on separate slave controllers 24. In other words, one of the slave controllers 24 does not save as a back-up copy the instructions of more than one of the primary controllers 18. The primary controllers 18 choose different slave controllers 24 to provide this redundancy. Therefore, if the interruption occurs any of the primary controllers 18, the chosen slave controller 24 for that interrupted primary controller 18 functions as the primary controller 18, thus providing seamless execution of the vehicle systems 12.

Generally, if using more than one primary controller 18, then each of the primary controllers 18 may include smaller memory storage as compared to using just one primary controller 18 because each of the primary controllers 18 controls some, not all, of the vehicle systems 12. If using a single primary controller 18, then all of the instructions, software, etc., to run all of the vehicle systems 12 must be stored on that one single primary controller 18, which requires a large memory (as compared to using more than one primary controller 18).

FIG. 5 provides a general overview of the method of executing the real-time control system 16 for the vehicle 10. At block 1000, a requested task 14 of one of the vehicle systems 12 is received by the primary controller 18. At block 1002, the primary controller 18 queues the requested task 14, in for example, the holding queue program 38 while the primary controller 18 determines which of the slave controllers 24 to assign this requested task 14. At block 1004, the primary controller 18 determines which of the slave controllers 24 is available to execute the task 14 and assigns the task 14 to one of the slave controllers 24 to execute the task 14. At block 1006, once the task 14 has been assigned, the task 14 is monitored by the monitoring program 40. At block 1008, a decision is made as to whether the selected one of the slave controllers 24 will complete the assigned task 14. At block 1010, if the selected one of the slave controllers 24 completes or executes the assigned task 14, then the vehicle system 12 operates, and the task 14 is de-queued from the primary controller 18. At block 1012, if the selected one of the slave controllers 24 does not complete the task 14 then the a task 14 is re-queued by removing the task 14 from the monitoring program 40 and sending the task 14 back to the holding queue program 38 to be re-assigned. Blocks 1002-1008 are repeated for the re-queued task 14 until the selected one of the slave controllers 24 completes or executes the re-assigned task 14. It is to be appreciated that the order or sequence of performing the method as identified in the flowchart of FIG. 5 is for illustrative purposes. It is to also be appreciated that the method may include other features not specifically identified in the flowchart of FIG. 5.

Referring to FIG. 6, an example flowchart is provided when the fault notification 42 is issued. At block 2000, the process level 30 of the selected slave controller 24 cannot complete execution of the assigned task 14. At block 2002, the core level 32 of the selected slave controller 24 returns the incomplete task 14 back to the holding queue program 38 of the primary controller 18. At block 2004, a decision is made as to whether the re-assigned task 14 can be completed. At block 2006, if the selected one of the slave controllers 24 completes or executes the assigned task 14, then the vehicle system 12 operates, and the task 14 is de-queued from the primary controller 18. At block 2008, if the selected one of the slave controllers 24 still cannot complete the task 14 then the core level 32 overrides the process level 30, and notifies the node level 34 of another fault notification 42. At block 2010, a decision is made as to whether the re-assigned task 14 can be completed. At block 2012, if the selected one of the slave controllers 24 completes or executes the assigned task 14, then the vehicle system 12 operates, and the task 14 is de-queued from the primary controller 18. At block 2014, if the selected one of the slave controllers 24 still cannot complete the task 14 then the node level 34 overrides the core level 32. At block 2016, a decision is made as to whether the re-assigned task 14 can be completed. At block 2018, if the selected one of the slave controllers 24 completes or executes the assigned task 14, then the vehicle system 12 operates, and the task 14 is de-queued from the primary controller 18. At block 2020, if the selected one of the slave controllers 24 still cannot complete the task 14 then the alternate program is implemented or triggered.

The real-time control system 16 may be implemented as a separate virtual machine alongside another virtual machine that implements a software platform, such as for example, automotive open system architecture (AUTOSAR). In this case, the real-time control system 16 will support hypervisors in order to be implemented with the platform operating AUTOSAR.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A real-time control system for a vehicle, the real-time control system comprising:
    at least one primary controller configured to execute instructions via a processor of the primary controller;
    a plurality of slave controllers configured to execute instructions via a processor of the respective slave controllers, and the primary controller is in communication with the slave controllers, and the primary controller is configured to control the slave controllers;
a plurality of vehicle systems configured to operate in response to at least one task requested via the respective vehicle systems, and the vehicle systems are in communication with the primary controller;
wherein the primary controller is configured to execute the instructions to:
queue the task requested by the respective vehicle systems;
determine which of the slave controllers is available to execute the task;
assign the task to a selected one of the slave controllers to execute the task;
re-queue the assigned task if the selected one of the slave controllers does not completely execute the assigned task;
assign the re-queued task to another one of the slave controllers to execute the re-queued task;
wherein the respective vehicle systems operate when the selected one of the slave controllers completely executes the assigned task;
wherein the primary controller includes a holding queue program in communication with the vehicle systems; and
wherein the holding queue program is configured to queue the task requested until the primary controller assigns the task to the selected one of the slave controllers.

2. The real-time control system as set forth in claim 1 wherein the primary controller includes a monitoring program in communication with the slave controllers, and the monitoring program is configured to monitor each assigned task that is currently being executed by the selected one of the slave controllers, and the monitoring program communicates a fault notification to the primary controller when the task currently being executed by the selected one of the slave controllers is not completed by a predetermined event, and the primary controller re-queues the assigned task back into the holding queue program when the fault notification is received.

3. The real-time control system as set forth in claim 2 wherein the predetermined event that triggers the fault notification includes a predetermined amount of time, a power interruption, a hardware interruption and a software interruption.

4. The real-time control system as set forth in claim 2 wherein the selected one of the slave controllers is configured to communicate to the monitoring program that execution of the assigned task is complete, and the task is de-queued from the monitoring program.

5. The real-time control system as set forth in claim 2 wherein the vehicle systems include an adaptive cruise control, a display screen control, autonomous control system, a brake system and powertrain controls.

6. The real-time control system as set forth in claim 1 wherein the at least one primary controller is further defined as one primary controller, and the one primary controller is in communication with each of the slave controllers, and the one primary controller is configured to control each of the slave controllers.

7. The real-time control system as set forth in claim 6 wherein a back-up copy of the instructions of the primary controller is also stored in memory of one of the slave controllers.

8. The real-time control system as set forth in claim 1 wherein:
the at least one primary controller is further defined as a plurality of primary controllers and each of the primary controllers is in communication with each of the slave controllers;
one of the primary controllers is in communication with a first set of the vehicle systems, and another one of the primary controllers is in communication with a second set of the vehicle systems;
the one of the primary controllers is configured to execute the instructions to:
queue the task requested by the first set of the vehicle systems;
determine which of the slave controllers is available to execute the task from the first set of the vehicle systems;
assign the task to the selected one of the slave controllers to execute the task from the first set of the vehicle systems;
re-queue the assigned task if the selected one of the slave controllers does not completely execute the assigned task; and
assign the re-queued task to another one of the slave controllers to execute the re-queued task;
the another one of the primary controllers is configured to execute instructions to:
queue the task requested by the second set of the vehicle systems;
determine which of the slave controllers is available to execute the task from the second set of the vehicle systems;
assign the task to the selected one of the slave controllers to execute the task from the second set of the vehicle systems;
re-queue the assigned task if the selected one of the slave controllers does not completely execute the assigned task; and
assign the re-queued task to another one of the slave controllers to execute the re-queued task.

9. The real-time control system as set forth in claim 1 wherein the vehicle systems include an adaptive cruise control, a display screen control, autonomous control system, a brake system and powertrain controls.

10. The real-time control system as set forth in claim 1 wherein the slave controllers are arranged in a parallel electrical connection relative to each other.

11. A real-time control system for a vehicle, the real-time control system comprising:
at least one primary controller configured to execute instructions via a processor of the primary controller;
a plurality of slave controllers configured to execute instructions via a processor of the respective slave controllers, and the primary controller is in communication with the slave controllers, and the primary controller is configured to control the slave controllers;
a plurality of vehicle systems configured to operate in response to at least one task requested via the respective vehicle systems, and the vehicle systems are in communication with the primary controller;
wherein the primary controller is configured to execute the instructions to:
queue the task requested by the respective vehicle systems;
determine which of the slave controllers is available to execute the task;
assign the task to a selected one of the slave controllers to execute the task;

re-queue the assigned task if the selected one of the slave controllers does not completely execute the assigned task;
assign the re-queued task to another one of the slave controllers to execute the re-queued task;
wherein the respective vehicle systems operate when the selected one of the slave controllers completely executes the assigned task;
wherein the at least one primary controller is further defined as a plurality of primary controllers, and each of the primary controllers is in communication with each of the slave controllers; and
wherein one of the primary controllers is in communication with a first set of the vehicle systems, and another one of the primary controllers is in communication with a second set of the vehicle systems.

12. The real-time control system as set forth in claim 11 wherein:
a back-up copy of the instructions of the one of the primary controllers is also stored in memory of one of the slave controllers; and
a back-up copy of the instructions of the another one of the primary controllers is also stored in memory of another one of the slave controllers.

13. A method of executing control of a vehicle via a real-time control system, the method comprising:
communicating between at least one primary controller and a plurality of slave controllers, wherein the primary controller is configured to control the slave controllers, and wherein the primary controller and the slave controllers are each configured to execute instructions via a respective processor;
communicating between the primary controller and a plurality of vehicle systems, and the vehicle systems are configured to operate in response to at least one task requested via the respective vehicle systems;
queuing, via the primary controller, the task requested by the respective vehicle systems;
determining, via the primary controller, which of the slave controllers is available to execute the task;
assigning the task to a selected one of the slave controllers to execute the task;
re-queuing, via the primary controller, the assigned task if the selected one of the slave controllers does not completely execute the assigned task;
determining, via the primary controller, which of the slave controllers is available to execute the re-queued task;
assigning the re-queued task to another one of the slave controllers to execute that re-queued task;
operating the respective vehicle systems when the selected one of the slave controllers completely executes the assigned task; and
wherein queuing the task includes queuing the task requested in a holding queue program of the primary controller until the primary controller assigns the task to the selected one of the slave controllers.

14. The method as set forth in claim 13 wherein re-queuing the task includes re-queuing the task requested in the holding queue program of the primary controller until the primary controller assigns the re-queued task to the selected one of the slave controllers.

15. The method as set forth in claim 13 further comprising monitoring each assigned task that is currently being executed by the selected one of the slave controllers in a monitoring program of the primary controller and communicating a fault notification to the primary controller when the task currently being executed by the selected one of the slave controllers is not completed by a predetermined event.

16. The method as set forth in claim 15 wherein the predetermined event that triggers the fault notification includes a predetermined amount of time, a power interruption, a hardware interruption and a software interruption.

17. The method as set forth in claim 15 wherein re-queuing that same task includes re-queuing that same task back into the holding queue program when the fault notification is received.

18. The method as set forth in claim 15 further comprising de-queuing from the monitoring program the assigned task when the selected one of the slave controllers completes the assigned task.

19. The method as set forth in claim 13 wherein the vehicle systems include an adaptive cruise control, a display screen control, autonomous control system, a brake system and powertrain controls.

20. The method as set forth in claim 13 wherein the slave controllers are arranged in a parallel electrical connection relative to each other.

* * * * *